(12) United States Patent
Oikawa et al.

(10) Patent No.: US 9,081,214 B2
(45) Date of Patent: Jul. 14, 2015

(54) OPTICAL CONTROL ELEMENT

(75) Inventors: Satoshi Oikawa, Tokyo (JP); Yuhki Kinpara, Tokyo (JP); Yasuhiro Ishikawa, Tokyo (JP); Katsutoshi Kondou, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 215 days.

(21) Appl. No.: 13/881,634

(22) PCT Filed: Oct. 25, 2010

(86) PCT No.: PCT/JP2010/068836
§ 371 (c)(1),
(2), (4) Date: May 28, 2013

(87) PCT Pub. No.: WO2012/056507
PCT Pub. Date: May 3, 2012

(65) Prior Publication Data
US 2013/0251301 A1 Sep. 26, 2013

(51) Int. Cl.
*G02F 1/035* (2006.01)
*G02F 1/01* (2006.01)
*G02F 1/225* (2006.01)
*G02F 1/21* (2006.01)

(52) U.S. Cl.
CPC ............... *G02F 1/011* (2013.01); *G02F 1/035* (2013.01); *G02F 1/225* (2013.01); *G02F 2001/212* (2013.01); *G02F 2201/05* (2013.01); *G02F 2201/08* (2013.01)

(58) Field of Classification Search
CPC ............ G02F 2001/212; G02F 1/3136; G02F 1/3137; G02F 1/0063; G02F 1/011; G02F 1/035; G02F 1/225
See application file for complete search history.

(56) References Cited

U.S. PATENT DOCUMENTS

| 7,362,924 B2 | 4/2008 | Ichioka et al. | |
| 7,444,039 B2 * | 10/2008 | Kondou et al. | 385/2 |
| 7,526,161 B2 | 4/2009 | Ishii et al. | |
| 8,909,006 B2 * | 12/2014 | Miyazaki et al. | 385/14 |
| 8,923,658 B2 * | 12/2014 | Ishikawa et al. | 385/3 |
| 2008/0002926 A1 | 1/2008 | Kondou et al. | |
| 2012/0027337 A1 | 2/2012 | Kondou et al. | |
| 2012/0207425 A1 * | 8/2012 | Kondou | 385/2 |
| 2013/0251301 A1 * | 9/2013 | Oikawa et al. | 385/2 |

FOREIGN PATENT DOCUMENTS

| JP | 4-24610 A | 1/1992 |
| JP | 10-293223 A | 11/1998 |
| JP | 2005-181748 A | 7/2005 |

(Continued)

*Primary Examiner* — Rhonda Peace
(74) *Attorney, Agent, or Firm* — Taft Stettinius & Hollister LLP

(57) ABSTRACT

An optical control element capable of efficiently removing unnecessary higher mode light without complicating a manufacturing process of the optical control element is provided. The optical control element includes a substrate having an electro-optical effect, optical waveguides that are formed on the substrate, and a control electrode that controls light waves propagating through the optical waveguides, and the optical waveguides include an output waveguide portion which derives fundamental mode light, and a subsidiary waveguide portion which is connected to the output waveguide portion and derives higher mode light, and removal means is formed in contact with the subsidiary waveguide portion, for removing the higher mode light propagating through the subsidiary waveguide portion.

5 Claims, 4 Drawing Sheets

(56) References Cited

FOREIGN PATENT DOCUMENTS

| | | |
|---|---|---|
| JP | 2006-276518 A | 10/2006 |
| JP | 2006-301612 A | 11/2006 |
| JP | 2008-46589 A | 2/2008 |
| JP | 2008-89875 A | 4/2008 |
| JP | 2010-237376 A | 10/2010 |
| JP | 2010-266628 A | 11/2010 |

* cited by examiner

OPTICAL CONTROL ELEMENT

BACKGROUND OF THE INVENTION

1. Field of the Invention

The present invention relates to an optical control element, and particularly to an optical control element, such as an optical modulator or an optical switch, which includes a substrate having an electro-optical effect, an optical waveguide formed on the substrate, and a control electrode for controlling light waves propagating through the optical waveguide.

2. Description of Related Art

In an optical communication field or an optical measurement field, an optical control element such as an optical modulator or an optical switch is frequently used in which an optical waveguide and a control electrode for controlling light waves propagating through the optical waveguide are provided on a substrate having an electro-optical effect.

In addition, in order to detect an operation state of the optical control element, for example, there has been proposed a method in which radiation mode light emitted from an optical modulator is reflected by grooves provided in a substrate and is monitored by a photodetector as disclosed in Japanese Laid-open Patent Publication No. 4-24610, a method in which higher mode light such as radiation mode light is derived outward from a substrate by using a monitoring optical waveguide as disclosed in Japanese Laid-open Patent Publication No. 2006-301612 or Japanese Laid-open Patent Publication No. 2008-46589, or the like.

In the optical control element, fundamental mode light which is signal light and higher mode light such as radiation mode light of an optical modulator or OFF light of an optical switch are required to be appropriately separated, and, it is essential for the separated higher mode light not to be incident again to the optical waveguide through which the fundamental mode light propagates, or for the higher mode light not to be incident more than necessary, as stray light, to monitoring means for monitoring an operation state of the optical control element as described above.

For this reason, a shielding means is provided in a region where the higher mode light such as radiation mode light propagates. However, a method, in which a depressed portion, such as a groove, is formed in a substrate as the shielding means and a light absorption material is buried in the depressed portion, complicates a manufacturing process, and causes the mechanical strength of the substrate to be reduced in a thin substrate. In addition, a method is disclosed in which a high refractive index region is formed in a substrate or a light absorption material film is formed on a substrate surface; however, many constituent elements such as an optical waveguide and a control electrode are required to be incorporated into the substrate surface. Therefore, if an installation region of the shielding means is sufficiently secured in order to exclude unnecessary higher mode light in advance, a degree of freedom of design of the optical control element is restricted, and this impedes miniaturization or the like of the optical control element.

SUMMARY OF THE INVENTION

The present invention has been made in order to solve the above-described problems, and an object thereof is to provide an optical control element capable of efficiently removing unnecessary higher mode light without complicating a manufacturing process of the optical control element.

In order to solve the above-described problems, according to a first aspect of the present invention, there is provided an optical control element including a substrate having an electro-optical effect; optical waveguides that are formed on the substrate, and a control electrode that controls light waves propagating through the optical waveguides, and the optical waveguides include an output waveguide portion which derives fundamental mode light, and a subsidiary waveguide portion which is connected to the output waveguide portion and derives higher mode light; and removal means is formed in contact with the subsidiary waveguide portion, for removing the higher mode light propagating through the subsidiary waveguide portion.

According to a second aspect of the present invention in the optical control element according to the first aspect, a waveguide width on an incidence side of the subsidiary waveguide portion may be smaller than a width of the output waveguide portion, and the width of the subsidiary waveguide portion may be larger than the width of the output waveguide portion in a region where the subsidiary waveguide portion is in contact with the removal means.

According to a third aspect of the present invention in the optical control element according to the first or second aspect, the removal means may be a high refractive index film or a metal film with a refractive index higher than a refractive index of the optical waveguides.

According to a fourth aspect of the present invention in the optical control element according to the third aspect, the metal film may be a portion of the control electrode.

According to a fifth aspect of the present invention in the optical control element according to any one of the first to fourth aspects, the output waveguide portion may be either an output waveguide of an optical waveguide forming a Mach-Zehnder type interferometer or an output waveguide of an optical switch.

According to the first aspect of the present invention, an optical control element includes a substrate having an electro-optical effect; optical waveguides that are formed on the substrate, and a control electrode that controls light waves propagating through the optical waveguides, and the optical waveguides include an output waveguide portion which derives fundamental mode light, and a subsidiary waveguide portion which is connected to the output waveguide portion and derives higher mode light; and removal means formed in contact with the subsidiary waveguide portion, for removing the higher mode light propagating through the subsidiary waveguide portion. Thereby, it is possible to selectively remove only higher mode light. In addition, the removal means may be provided only on the subsidiary waveguide portion from which higher mode light is derived, and a region where the removal means takes up the substrate of the optical control element is extremely restricted. Further, the subsidiary waveguide portion can be formed together when typical optical waveguides including the output waveguide portion are formed, and thus a manufacturing process is not complicated.

According to the second aspect of the present invention, a waveguide width on an incidence side of the subsidiary waveguide portion is smaller than a width of the output waveguide portion, and the width of the subsidiary waveguide portion is larger than the width of the output waveguide portion in a region where the subsidiary waveguide portion comes into contact with the removal means. Therefore, since only higher mode light can be selectively introduced into the subsidiary waveguide portion, the higher mode light is made to propagate in a multi-mode in the region where the removal means is disposed and thereby it is possible to further increase the removal effect by the removal means.

According to the third aspect of the present invention, the removal means is a high refractive index film or a metal film with a refractive index higher than a refractive index of the optical waveguides. Therefore, since, in a case of the high refractive index film, higher mode light can be derived with high efficiency outward from the optical control element, and in a case of the metal film, higher mode light can be absorbed with high efficiency, it is possible to increase the removal efficiency. Further, since a depressed portion such as a groove is not formed unlike the example in the related art, the mechanical strength is not reduced even in an optical control element which uses a thin substrate.

According to the fourth aspect of the present invention, since the metal film is a portion of the control electrode, the removal means can be formed together when the control electrode is formed. Therefore, it is possible to prevent a manufacturing process from being complicated. Particularly, a portion of a ground electrode forming the control electrode is used as the removal means, and thereby it is possible to relatively freely select an installation location of the removal means.

According to the fifth aspect of the present invention, the output waveguide portion is either an output waveguide of an optical waveguide forming a Mach-Zehnder interferometer or an output waveguide of an optical switch. Therefore, if the present invention is applied to an optical modulator or an optical switch in which higher mode light tends to be generated, it is possible to efficiently remove unnecessary higher mode light.

DETAILED DESCRIPTION OF THE INVENTION

Figure 1:
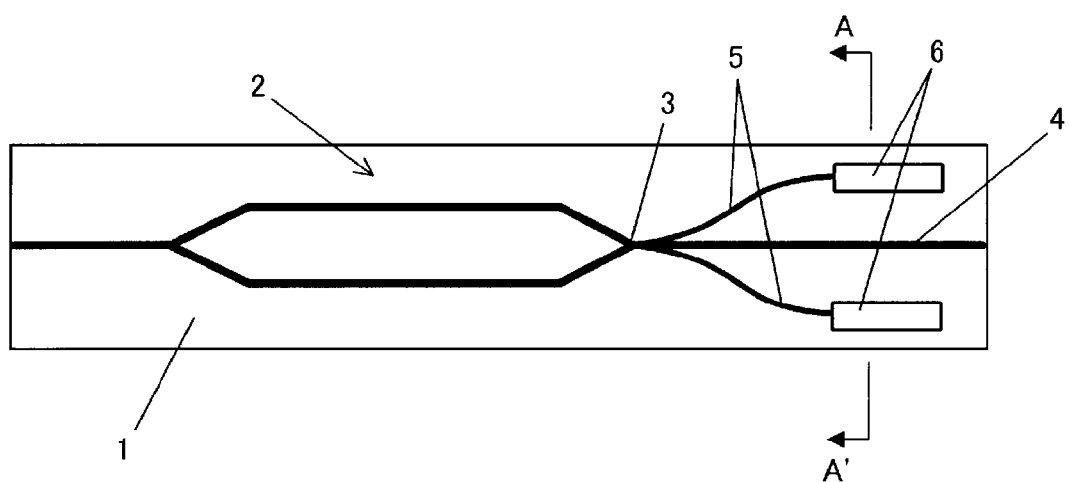
FIG. 1 is a plan view illustrating an optical control element according to a first embodiment of the present invention.

Hereinafter, an optical control element of the present invention will be described in detail. As shown in the first embodiment of FIG. 1, the optical control element of the present invention includes a substrate 1 having an electro-optical effect, optical waveguides 2 to 5 formed on the substrate, and a control electrode (not shown) for controlling light waves propagating through the optical waveguides. The optical waveguides include an output waveguide portion 4 which derives fundamental mode light and subsidiary waveguide portions 5 which are connected to the output waveguide portion 4 and derive higher mode light. In addition, removal means 6 for removing higher mode light which propagates through the subsidiary waveguide portions 5 is formed in contact with the subsidiary waveguide portions 5.

According to the optical control element of the present invention, only the higher mode light can be selectively removed by the subsidiary waveguide portions 5. FIG. 2 is a cross-sectional view taken along the arrow A-A' of FIG. 1. As shown in FIG. 2, the removal means 6 may be provided only on the subsidiary waveguide portions 5 from which higher mode light is derived, and a region where the removal means takes up the substrate of the optical control element may be extremely restricted. Therefore, light blocking means need not be provided at many locations of the substrate unlike in the related art.

As materials of the substrate 1 having the electro-optical effect, for example, lithium niobate, lithium tantalate, PLZT (lead lanthanum zirconate titanate), quartz-based materials, and the like may be used. As methods of forming the optical waveguides 2 to 5, there is a method of forming optical waveguides on a substrate surface through thermal diffusion of Ti or proton exchange, a method of forming optical waveguides by using a ridge shape corresponding to a waveguide, and the like. The control electrode (not shown) includes a signal electrode or a ground electrode, and may be formed using a gold plating method or the like by forming an electrode pattern of Ti.Au on the substrate surface. In addition, a dielectric buffer layer of $SiO_2$ may be formed on the substrate surface after the optical waveguides are formed as necessary; however, in a case where a low refractive index layer such as the buffer layer is formed on the surface of the optical waveguides 5 which is in contact with the removal means 6, a light removal effect is reduced, and thus such a film body is not preferably formed in the corresponding regions.

Since both the output waveguide portion 4 and the subsidiary waveguide portions 5 are a portion of the optical waveguides, they can be formed through thermal diffusion of Ti or the like in the same manner as the optical waveguides constituting the optical control element as described above. Further, the output waveguide portion 4 and the subsidiary waveguide portions 5 can be formed together when a typical optical waveguide is formed, and thus a manufacturing process is not complicated. In the first embodiment shown in FIG. 1, the optical waveguides 2 form a Mach-Zehnder type interferometer, and the subsidiary waveguide portions 5 related to the present invention is disposed so as to be connected to the output waveguide of the Mach-Zehnder type interferometer forming the output waveguide portion 4.

Fundamental mode light which will become ON mode light, emitted from a multiplexing portion 3 of the interferometer, propagates through the output waveguide portion 4, and higher mode light such as radiation mode light which will become OFF mode light, emitted from the multiplexing portion 3 propagates through the subsidiary waveguide portions 5.

Figure 2:
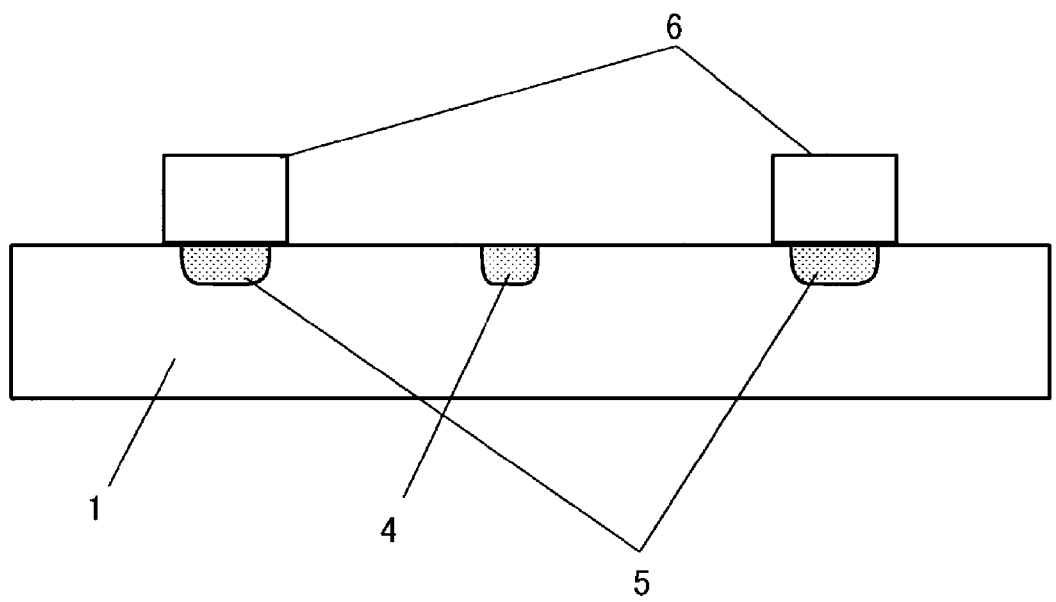
FIG. 2 is a cross-sectional view taken along the arrow A-A' of FIG. 1.
Figure 3:
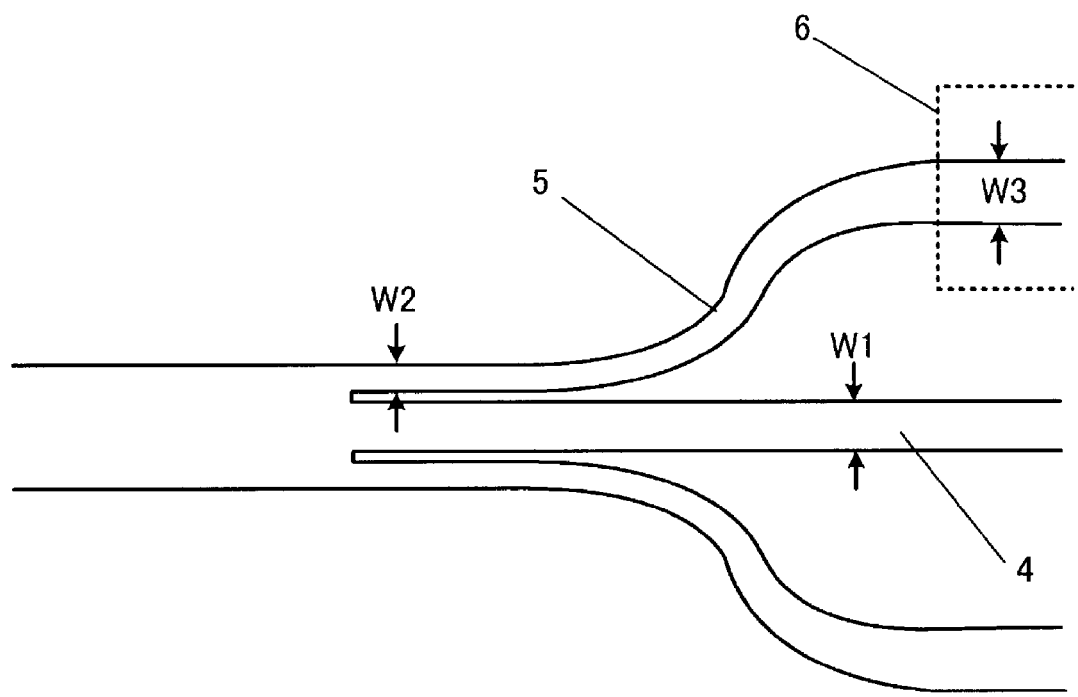
FIG. 3 is a diagram illustrating a relationship between an output waveguide portion and a subsidiary waveguide portion in the optical control element of the present invention.

FIG. 3 is a diagram illustrating an example of the relationship between the output waveguide portion 4 and the subsidiary waveguide portions 5 of FIG. 1, and exemplifies a connection state of each waveguide portion and a width of each waveguide. The output waveguide portion 4 of the present invention is used to derive fundamental mode light, and, when using the width W1 of the output waveguide portion 4 as a reference, in relation to the subsidiary waveguide portions 5, the width W2 of the part connected to the output waveguide portion 4 is set to satisfy a condition "W2<W1", and the width W3 of the part which comes into contact with the removal means 6 is set to satisfy a condition "W3>W1".

Only higher mode light can be selectively introduced into the subsidiary waveguide portions by setting the condition regarding the width W2. In addition, by setting the condition regarding the width W3, the higher mode light is made to propagate in multi-mode in the regions where the removal means is disposed and thereby it is possible to further increase the removal effect by the removal means. In other words, as the width of the optical waveguide increases, the center of the propagating mode light is present further toward the surface side, that is, the mode light is unevenly present on the surface side. For this reason, the light waves which propagate through the subsidiary waveguide portions 5 can be easily removed by the removal means 6.

As the removal means 6, a high refractive index film or a metal film with a higher refractive index than that of the optical waveguide 5 may be selected. In a case of using the high refractive index film, higher mode light can be derived with high efficiency outward from the optical control element. In addition, in a case of using the metal film, higher mode light can be absorbed with high efficiency, and thus it is possible to increase the removal efficiency. Further, since a depressed portion such as a groove is not formed unlike shielding means in the related art, the mechanical strength is not reduced even in an optical control element which uses a thin substrate.

In addition, in a case where the removal means 6 is formed using the metal film, a portion of the control electrode (not shown) forming the optical control element, for example, a portion of a ground electrode forming the control electrode is used as the removal means, and thereby the removal means 6 can be formed together when the control electrode is formed. Therefore, it is possible to prevent a manufacturing process from being complicated. Further, the ground electrode is provided in a relatively wide region of the substrate surface, and thus it is possible to increase a degree of freedom of an installation location of the removal means 6.

Figure 4:
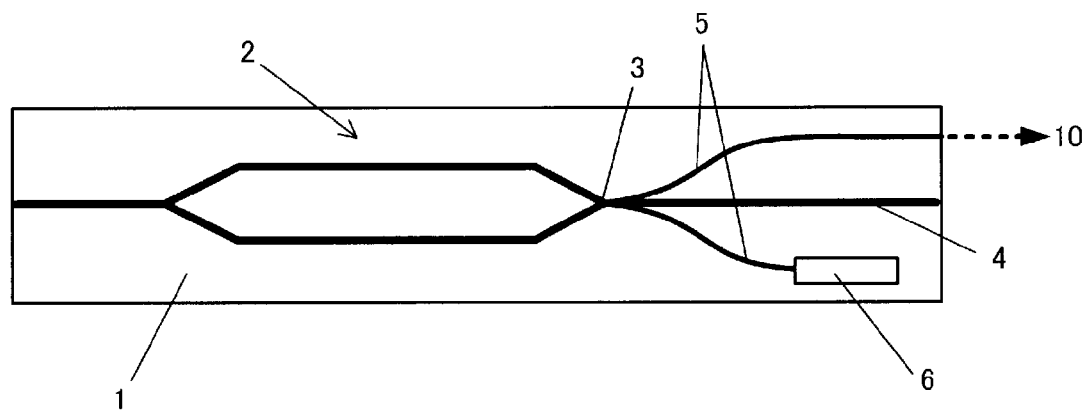
FIG. 4 is a plan view illustrating an optical control element according to a second embodiment of the present invention.

Other embodiments regarding the optical control element of the present invention will be described with reference to FIGS. 4 to 7. In FIG. 4, one of the subsidiary waveguide portions 5 of FIG. 1 can be used for driving control of the optical control element by deriving radiation light (monitoring light) 10 from the optical control element so as to be monitored by a photodetector or the like. In addition, the removal means 6 is installed on the subsidiary waveguide portion 5 which does not derive monitoring light.

Figure 5:
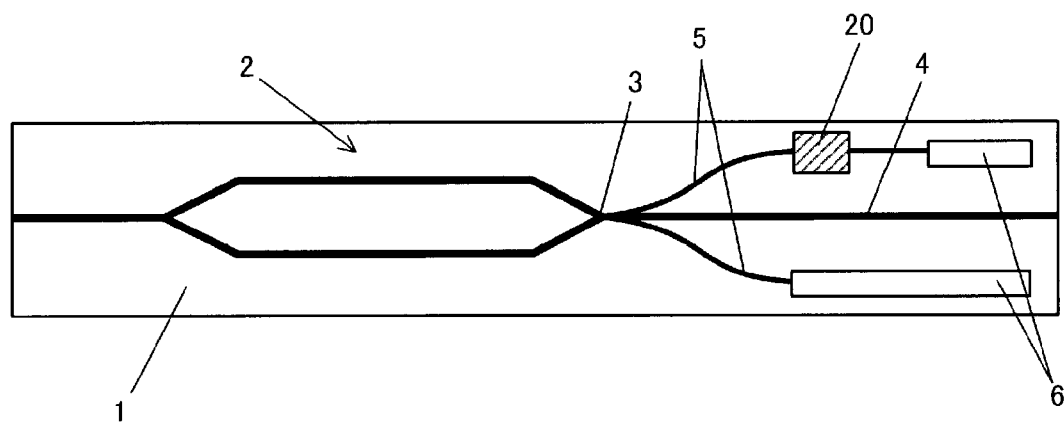
FIG. 5 is a plan view illustrating an optical control element according to a third embodiment of the present invention.

In FIG. 5, in order to monitor light waves which propagate through the subsidiary waveguide portion 5, a photodetector 20 which detects some of the light waves which propagate through the subsidiary waveguide portion 5 is formed on the substrate 1. In addition, the other light waves which are not derived by the photodetector 20 are removed by the removal means 6.

Figure 6:
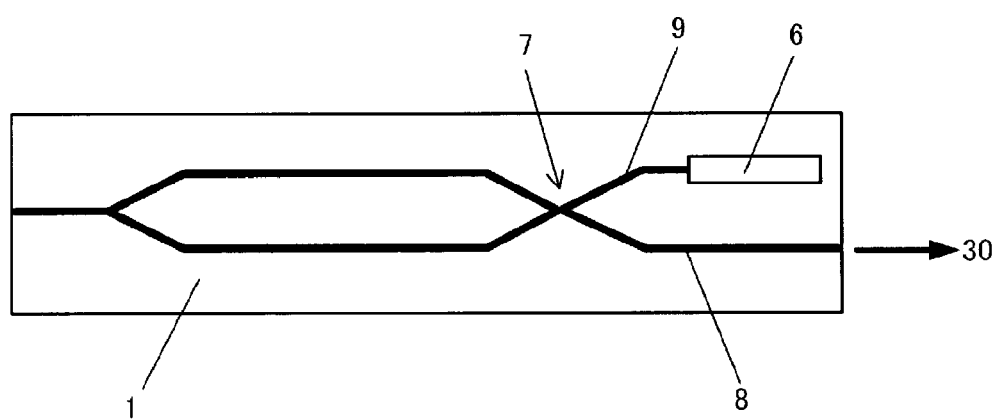
FIG. 6 is a plan view illustrating an optical control element according to a fourth embodiment of the present invention.

In FIG. 6, an optical coupler 7 is disposed on an emission side of the optical waveguide, and signal light 30 is derived outward from the element via an output waveguide portion 8. Higher mode light other than the signal light is guided to the removal means 6 via a subsidiary waveguide portion 9.

Figure 7:
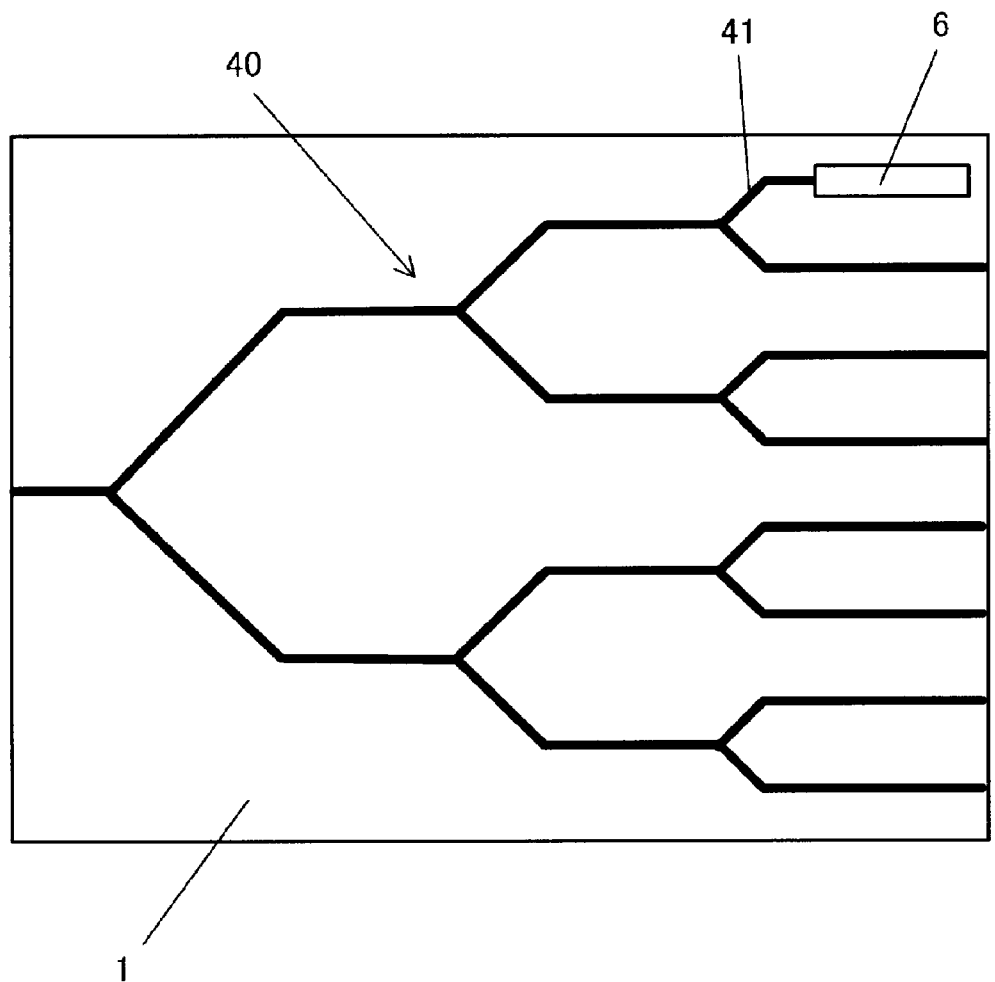
FIG. 7 is a plan view illustrating an optical control element according to a fifth embodiment of the present invention.

In FIG. 7, an optical waveguide 40 is formed of a plurality of branching portions, and an optical switch or the like may be appropriately formed in the light branching portion. In FIG. 7, a waveguide portion 41 for guiding light waves derived by the light branching portion or the optical switch, particularly, unused light waves, is provided, and the unused light waves are removed using the removal means 6. In FIG. 7, the removal means is provided in only one port but may be provided in a plurality of ports.

Needless to say, the configuration of the output waveguide portion or the subsidiary waveguide portions, the configuration of the removal means, or the like described in the first embodiment can be applied to the various embodiments (the second to fifth embodiments) related to FIGS. 4 to 7 described above in the same manner.

As described above, according to the present invention, it is possible to provide an optical control element capable of efficiently removing unnecessary light without complicating a manufacturing process of the optical control element.

What is claimed is:

1. An optical control element comprising:
   a substrate having an electro-optical effect;
   optical waveguides formed on the substrate; and
   a control electrode that controls light waves propagating through the optical waveguides, wherein
   the optical waveguides comprise an output waveguide portion which derives fundamental mode light, and a subsidiary waveguide portion which is connected to the output waveguide portion and derives higher mode light;
   removal means are formed in contact with the subsidiary waveguide portion, for removing the higher mode light propagating through the subsidiary waveguide portion; and
   a waveguide width on an incidence side of the subsidiary waveguide portion is smaller than a width of the output waveguide portion, and a width of the subsidiary waveguide portion is larger than the width of the output waveguide portion in a region where the subsidiary waveguide portion is in contact with the removal means.

2. The optical control element according to claim 1, wherein the removal means is a high refractive index film or a metal film with a refractive index higher than a refractive index of the optical waveguides.

3. The optical control element according to claim 1, wherein the output waveguide portion is an output waveguide of an optical waveguide forming a Mach-Zehnder type interferometer, or an output waveguide of an optical switch.

4. An optical control element comprising:
   a substrate having an electro-optical effect;
   optical waveguides formed on the substrate; and
   a control electrode that controls light waves through the optical waveguides, wherein
   the optical waveguides comprise an output waveguide portion which derives fundamental mode light, and a subsidiary waveguide portion which is connected to the output waveguide portion and derives higher mode light;
   removal means are formed in contact with the subsidiary waveguide portion, for removing the higher mode light propagating through the subsidiary waveguide portion;
   the removal means is a metal film; and
   the metal film is a portion of the control electrode.

5. The optical control element according to claim 4, wherein the output waveguide portion is an output waveguide of an optical waveguide forming a Mach-Zehnder type interferometer, or an output waveguide of an optical switch.

* * * * *